United States Patent
Spafford et al.

(10) Patent No.: US 8,874,967 B2
(45) Date of Patent: Oct. 28, 2014

(54) MANAGING CODE-TRACING DATA

(75) Inventors: Michael Spafford, Fife (GB); Jan Vesely, Monifieth (GB)

(73) Assignee: NCR Corporation, Duluth, GA (US)

( * ) Notice: Subject to any disclaimer, the term of this patent is extended or adjusted under 35 U.S.C. 154(b) by 256 days.

(21) Appl. No.: 13/436,298

(22) Filed: Mar. 30, 2012

(65) Prior Publication Data

US 2013/0262933 A1    Oct. 3, 2013

(51) Int. Cl.
*G06F 11/00*    (2006.01)

(52) U.S. Cl.
USPC ........................................................ 714/38.1

(58) Field of Classification Search
CPC ............. G06F 11/3636; G06F 11/366; G06F 11/0736; G06F 11/0781; G06F 11/323; G06F 11/0793
USPC ........................................................ 714/1-57
See application file for complete search history.

(56) References Cited

U.S. PATENT DOCUMENTS

| | | | | |
|---|---|---|---|---|
| 6,785,883 | B1 * | 8/2004 | Slomak | 717/128 |
| 7,930,590 | B2 * | 4/2011 | Cheng et al. | 714/25 |
| 7,962,803 | B2 * | 6/2011 | Huber et al. | 714/45 |
| 2006/0112312 | A1 * | 5/2006 | Dickenson et al. | 714/28 |
| 2008/0222456 | A1 * | 9/2008 | Jones | 714/45 |
| 2009/0049342 | A1 * | 2/2009 | Dickenson et al. | 714/45 |
| 2009/0217096 | A1 * | 8/2009 | Ing et al. | 714/37 |
| 2010/0083052 | A1 * | 4/2010 | Huber et al. | 714/45 |
| 2013/0198572 | A1 * | 8/2013 | Han | 714/38.1 |

* cited by examiner

*Primary Examiner* — Nadeem Iqbal
(74) *Attorney, Agent, or Firm* — Joseph P. Merhle

(57) ABSTRACT

A method of managing code-tracing data is described. The method comprises the steps of: analyzing a log of code-tracing data to identify a module in which an error occurred; activating code-tracing at a high detail level in that module; identifying modules associated with that module; and activating code-tracing at a high detail level in those identified modules.

14 Claims, 2 Drawing Sheets

MANAGING CODE-TRACING DATA

FIELD OF INVENTION

The present invention relates to managing code-tracing data.

BACKGROUND OF INVENTION

To improve fault detection in software, software engineers typically add instrumentation code to software components (application software, drivers, and the like) so that code-tracing data is generated automatically by the instrumentation code as the software components execute. The instrumentation code typically generates code-tracing data when certain functions are performed, status changes occur, and the like. A trace manager is used to store the code-tracing data generated by the instrumentation code in a log file.

If a fault occurs, then the log file can be analyzed to identify the cause of the fault. For example, the code-tracing data may indicate if any unexpected events occurred, or if any expected events did not occur, prior to the fault occurring.

Although generating and storing code-tracing data has clear advantages, there are also problems associated with managing code-tracing data.

One problem is that instrumentation code can produce a large amount of code-tracing data every second, which consumes valuable storage space and may slow down the operation of the software as the log file is written to disk. Furthermore, the large quantity of code-tracing data produced makes it difficult to identify the code-tracing data that is relevant to an error. Other errors may be detected that are irrelevant to, and may obscure, the error being targeted.

Another problem is that if the level of tracing is reduced, then the information that may help identify the cause of an error may not be present in the code-tracing data.

It would be a benefit to overcome or mitigate some of these disadvantages, or other disadvantages associated with managing code-tracing data.

SUMMARY OF INVENTION

Accordingly, the invention generally provides methods, systems, apparatus, and software for managing code-tracing data.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of managing code-tracing data, the method comprising the steps of:

analyzing a log of code-tracing data to identify a module in which an error occurred;
activating code-tracing at a high detail level in that module;
identifying modules associated with that module; and
activating code-tracing at a high detail level in those identified modules.

The error may be an unhandled exception.

The module in which the error occurred may comprise a service in a control application. The identified modules may comprise service providers and/or drivers associated with the service.

The service providers may comprise CEN XFS modules. CEN is the European Committee for Standardization, and XFS is the eXtensions for Financial Services standard. The current version of this CEN XFS standard is v.3.10.

The method may include the further step of creating a code-tracing profile to include high detail level code-tracing for the module in which the error occurred, and associating a defect type with this profile. For example, a cash-in (deposit) module may have thrown an exception, and the method may involve creating a code-tracing profile associated with cash-in failures. This profile may be used by default if a system is prone to cash-in module failures.

The method may comprise the further steps of detecting a pattern of errors over a period of time (for example, exceptions thrown by a cash-out module); and applying a code-tracing profile appropriate for the detected pattern (for example, a cash-out module profile).

The method may comprise the further steps of: detecting the absence of an error over a defined time period; and reducing the code-tracing detail level.

The code-tracing detail may be reduced and the system may be rebooted so that the new code-tracing detail is applied. Alternatively, the new code-tracing detail may be applied directly by updating registry settings for the modules in which the code-tracing detail is to be changed.

As is known to those of skill in the art, an "exception" is a special condition that changes the normal flow of the target program execution, causing it to branch to a different routine. When an exception is "thrown" it will travel through the layers of code in the target program until it is dealt with. If the target program does not "catch" the exception, for example, because the programmer did not write a module to handle that particular exception, then the exception makes its way to the top layer of the target program and the operating system recognizes it as an "unhandled exception" and shuts down the target program, resulting in a fatal exception error.

According to a second aspect there is provided a system for managing code-tracing data, the system comprising:

a trace manager arranged to (i) analyze a log of code-tracing data to identify a module in which an error occurred; (ii) activate code-tracing at a high detail level in that module; (iii) identify modules associated with that module; and (iv) activate code-tracing at a high detail level in those identified modules.

The trace manager may comprise a software component.

The trace manager may be implemented by a CEN XFS compliant software component. Alternatively, the trace manager may be implemented by a proprietary code-tracing data storage component.

The module in which an error occurred may comprise a CEN XFS module.

The identified modules may include an XFS service provider for that XFS module.

The trace manager may be further arranged to: create a code-tracing profile to include high detail level code-tracing for the module in which the error occurred; and associate a defect type with this profile.

The trace manager may be further arranged to: detect a pattern of errors over a period of time (for example, exceptions thrown by a cash-out module); and apply a code-tracing profile appropriate for the detected pattern (for example, a cash-out module profile).

The trace manager may be further arranged to: detect the absence of an error over a defined time period; reboot a system executing the method; and reduce the code-tracing detail level.

According to a third aspect there is provided a computer program comprising program instructions for executing the steps of the first aspect.

The computer program may be stored on a computer readable medium, such as a computer memory, an input/output data storage device (such as a magnetic or optical disk, or a Flash storage drive) or the like.

According to a fourth aspect there is provided a computer data signal embodied on a carrier wave encoding instructions that, when executed on a processor, implement the method of the first aspect.

According to a fifth aspect there is provided a self-service terminal comprising a plurality of modules for providing transaction-related functions to a customer of the self-service terminal, and a controller coupled to the modules, and executing a runtime platform including a trace manager, the trace manager being arranged to (i) analyze a log of code-tracing data to identify a module in which an error occurred; (ii) activate code-tracing at a high detail level in that module; (iii) identify modules associated with that module; and (iv) activate code-tracing at a high detail level in those identified modules.

The error may be an unhandled exception.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
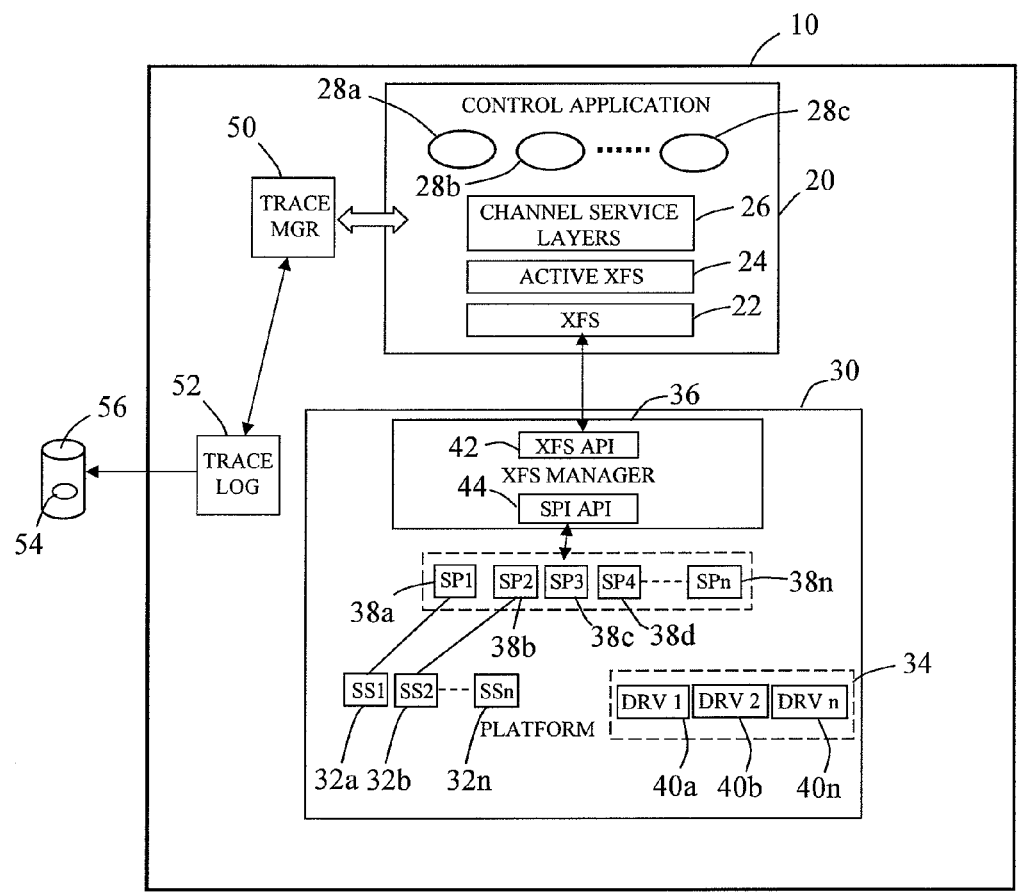
FIG. 1 is a simplified schematic diagram of an SST memory executing software components according to an embodiment of the present invention.

Reference will now be made to FIG. 1, which is a simplified schematic diagram showing an SST memory 10 executing software components. In this embodiment the SST is an ATM. The software components comprise: a control application 20, a runtime platform 30, and a code-tracing manager 50.

The Control Application 20

As is known in the art, the control application 20 presents a sequence of screens on an ATM display to a customer at the ATM, collates information from the customer (for example, customer account information from a customer's ATM card, transaction request, and the like), obtains authorization for a transaction request from a remote authorization host (not shown), and instructs modules within the ATM, as needed, to fulfill an authorized transaction.

As is also known in the art, the control application 20 also comprises a conventional CEN XFS interface 22 for communicating with an XFS manager (described as box 36 below) in the runtime platform 30. CEN is the European Committee for Standardization, and XFS is the eXtensions for Financial Services standard. The current version of this CEN XFS standard is v.3.10.

The control application 20 includes a layer (logically) above the CEN XFS interface 22 called the ACTIVE XFS layer 24. The ACTIVE XFS layer 24 provides an interface to support object oriented environments (such as .NET, COM (component object model) environments, and the like). This is used because the standard CEN XFS interface 22 supports primarily procedural language environments (such as C).

The control application 20 also includes many channel services layers 26 (not illustrated individually in FIG. 1). The channel services layers include a layer for each of the following: a Cash Accept Service, a Cash Dispense service, a Receipt Print service, a Journal Print service, a Renderer (display) service, and the like. These channel services layers are conventional on XFS-compliant ATMs, and suitable software components including these services are available from NCR Corporation, 3097 Satellite Blvd., Duluth, Ga. 30096, U.S.A.

The control application 20 also includes business services 28 (only three of which are illustrated in FIG. 1, labeled 28a through 28c, although full embodiments may have more than three business services). These business services 28 call the appropriate channel services 26 to execute a desired transaction. The business services 28 are components that provide a business function (such as a transaction authorization, a targeted advertisement, a balance enquiry, and such like). In this embodiment, business service 28c provides cash dispense and cash deposit transactions (referred to as the cash business service 28c in this embodiment).

The Runtime Platform 30

The runtime platform 30 comprises proprietary device drivers, 32a,b, . . . n (only three of which are illustrated), an operating system 34, an XFS manager 36, and XFS service providers 38a,b,c,d . . . n.

In this embodiment, the operating system 34 is a Windows XP (trade mark) operating system, available from Microsoft Corporation (trade mark). The operating system 34 includes a plurality of standard device drivers 40a,b, . . . n for interfacing with standard computing devices such as a magnetic disk drive, a display, USB ports, serial ports, a parallel port, and such like. As is well known in the art, the operating system 34 is responsible for memory, process, task, and disk management, and includes routines for implementing these functions.

The proprietary device drivers 32 are a set of APTRA (trade mark) XFS components, available from NCR Corporation, 3097 Satellite Blvd., Duluth, Ga. 30096, U.S.A. The device drivers 32 provide a range of programming facilities specific to self-service terminal devices and services.

One function of the device drivers 32 is to enhance the operating system 34 so that the operating system 34 and device drivers 32 together provide high level access to all of the devices and modules, including both standard home computing devices (via the operating system 34), and XFS computing devices (via the run-time components 32). Thus, the combination of the device drivers 32 and the operating system 34 can be viewed as providing a complete ATM operating system.

The service providers 38 provide a vendor-independent interface to the device drivers 32.

The device drivers 32 interface with self-service specific devices, and include support files (not shown), to allow each device or module to be operated, tested, maintained, and configured. Although only a few device drivers 32a,b are shown, there are many device drivers 32, one for each self-service specific module, such as a card reader (not shown), a receipt printer (not shown), an encrypting keypad (not shown) and FDKs (not shown), and a cash dispenser (not shown). Furthermore, there are many more devices and modules in an ATM than those described herein, for example there are more standard computing devices such as USB ports and a parallel port, there may also be more self-service devices and modules, such as a statement printer, a cash accept module, and the like. These devices and modules are not discussed herein because they are not essential to an understanding of the invention.

The XFS manager 36 includes an XFS application programming interface (API) 42 and a service provider interface (SPI) 44.

The service providers 38 communicate with the XFS manager 36 and also with the self-service device drivers 32 and the standard device drivers 40 associated with the modules. Suitable service providers are available from NCR Corporation, 3097 Satellite Blvd., Duluth, Ga. 30096, U.S.A.

The service providers 38 provide a high level of abstraction to allow the business services 28 to issue standard XFS commands to request functions and services. The service providers 38 translate these XFS commands for the particular device drivers 32,40 used in the runtime platform 30. Each service provider 38 is typically associated with one module (such as a cash dispenser module).

The Code-Tracing Manager 50 and Trace Log 52

The code-tracing manager 50 also executes in the memory 10 and communicates with the control application 20. The code-tracing manager 50 can save data into a code trace log 52 stored in the memory 10. Periodically, the code trace log 52 is stored as a trace file 54 on a permanent I/O storage 56 within the ATM. In this embodiment, the permanent I/O storage 56 is a disk drive.

The business services 28 and the channel services layers 26 within the control application 20 all comprise instrumented code (that is, code that includes instrumentation). The instrumented code provides checkpoints, trace lines, and other diagnosis tools.

Whenever a specified event occurs in one of the modules (for example, the cash business service 28c), then the code-tracing manager 50 receives trace information from the instrumented code. Depending on the level of code-tracing selected by the code-tracing manager 50, this trace information may be saved in the code trace log 52. The higher the level (or detail) of code-tracing applied by the code-tracing manager 50, the more information that is stored in the code trace log 52.

In the case of a function call, the instrumented code in the control application 20 creates data to indicate (i) the client thread that called the function, (ii) when the function was called, (iii) the name of the function called, and (iv) the names and values of the parameters input to the function, and output from the function.

The instrumented code creates a code-tracing object populated with (i) the created data, (ii) the reference identifying the object (for example, the cash business service 28c) incorporating the trace line in the instrumented code that created the code-tracing object, and (iii) a category for the created data.

The reference is included so that the code-tracing object identifies the function that caused the code-tracing object to be created; or more accurately, the software containing the instrumentation code that created the code-tracing object.

The category indicates what type of data is included in the code-tracing object. For example, the category may be one of the following: entry point, exit point, general data, information, warning, or error. The category is created automatically based on the type of instrumented code that created the data.

The category is a property of the code-tracing object. The reference is also a property of the code-tracing object.

The code-tracing manager 50 typically includes configuration information that stores the name and path of the trace file 54 on the hard drive 56.

Operation of Code-Tracing Manager

Figure 2:
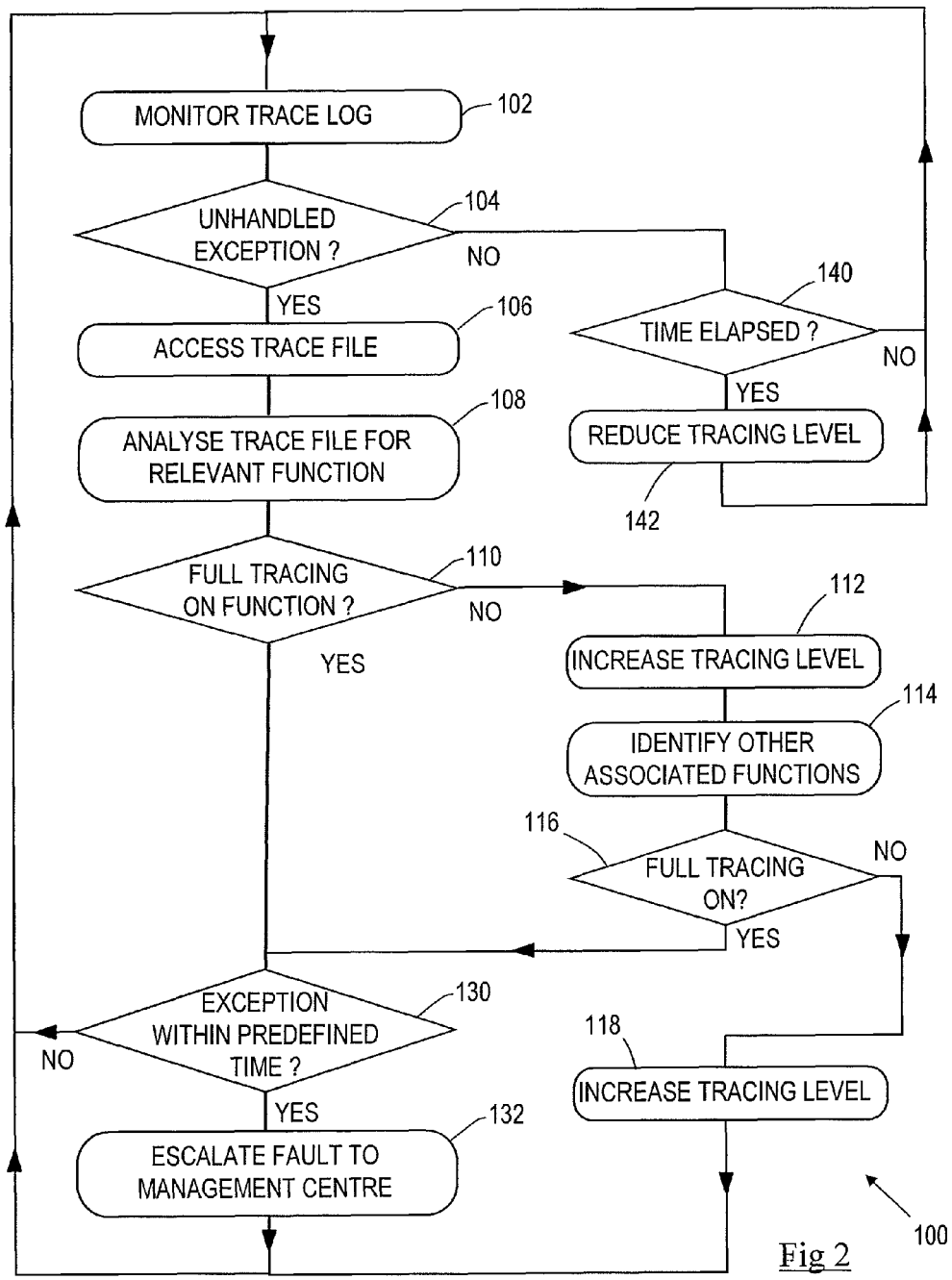
FIG. 2 is a flowchart illustrating steps implemented by one of the software components of FIG. 1 (the code-tracing manager) when an unhandled exception occurs.

The operation of the code-tracing manager 50 will now be described with reference to FIG. 2, which is a flowchart 100 illustrating steps implemented by the code-tracing manager 50 when a serious error, such as an unhandled exception, occurs. The example of an unhandled exception will be used in the following description, although another kind of serious error would be dealt with in a similar manner.

Initially, the code-tracing manager 50 monitors the code trace log 52 (step 102) to detect an unhandled exception (step 104). Alternatively, the code-tracing manager 50 may receive an event directly that indicates that an unhandled exception has occurred.

If an unhandled exception is detected, then the code-tracing manager 50 accesses the trace file 54 (step 106). This may occur after the ATM has been rebooted (if rebooting was necessitated by the unhandled exception).

The code-tracing manager 50 then analyses the data stored in the trace file 54 to identify the function (service or module) that was executing when the unhandled exception occurred (step 108). In other words, the code-tracing manager 50 identifies the function that threw the exception. In this example, the cash business service 28c threw the exception.

The code-tracing manager 50 then ascertains if the function that threw the exception (in this example, the cash business service 28c) has the highest level of tracing enabled (step 110).

If not, then the code-tracing manager 50 assigns a higher level of tracing to the cash business service 28c (step 112). In this embodiment, the code-tracing may be set to one of three different levels, low, medium, and high detail level. These three levels are referred to as three different tracing profiles.

The code-tracing manager 50 then ascertains if the function that threw the exception (in this example, the cash business service 28c) has called (or accessed) other functions (step 114). In this example, the cash business service 28c has called a Cash Deposit Service in the channel services layers 26, which called a Cash Depository Service Provider in the XFS service providers 38.

The code-tracing manager 50 then ascertains if each of these called modules (services or functions) has the highest level of tracing enabled (step 116).

If not, then the tracing level for that or those modules (the Cash Deposit Service and the Cash Depository Service Provider) is increased by the code-tracing manager 50 (step 118), and the flow returns to step 102, where the code-tracing manager 50 monitors the code trace log 52 for an unhandled exception.

If each of these called modules has the highest level of tracing enabled, then the code-tracing manager 50 advances to step 130.

Returning to step 110, if the function that threw the exception (in this example, the cash business service 28c) has the highest level of tracing enabled, then the code-tracing manager 50 advances to step 130.

At step 130, the code-tracing manager 50 ascertains if the unhandled exception occurred within a predefined time period since the last unhandled exception relating to that function (the cash business service 28c). This predefined time period can be set by the owner of the ATM, but in this embodiment the predefined time period is twenty minutes.

If the unhandled exception occurred within this predefined time period then the code-tracing manager 50 escalates the unhandled exception as a serious incident and sends a message to a remote management centre (not shown) (step 132) so that a service engineer can be dispatched. In this embodiment, the code-tracing manager 50 sends a trap across a network connection (not shown) to the remote management centre (not shown).

If the unhandled exception did not occur within this predefined time period then the code-tracing manager 50 returns to step 102, where the code-tracing manager 50 monitors the code trace log 52 for an unhandled exception.

Returning to step 104, if the code-tracing manager 50 does not detect an unhandled exception within a safety period (also a predefined time period that can be set by the owner of the ATM) (step 140), then the code-tracing manager 50 reduces the trace detail level on the modules that previously had their trace detail level increased (step 142). This is to ensure that the software is not unduly slowed down by a high level of tracing detail if there are no exceptions occurring. In this embodiment, the safety period is twelve hours.

The code-tracing manager 50 then returns to step 102, where the code-tracing manager 50 monitors the code trace log 52 for an unhandled exception.

It will now be appreciated that the above embodiment has the advantage that the trace manager 50 intelligently changes the level of tracing applied based on previous unhandled exceptions, and dynamically lowers the level of tracing applied if there are no unhandled exceptions for an extended period of time. Furthermore, the trace file 54 will contain the most relevant information because the most detailed tracing was directed towards the module that threw the exception, and related modules. This provides a diagnostic engineer with much relevant and useful information. The levels of tracing to be applied are configurable. The modules that are selected for tracing are not hard coded, but are selected based on proximity to the exception.

Various modifications may be made to the above described embodiment within the scope of the invention, for example, in other embodiments, the SST may not implement the CEN XFS standard. In such embodiments, a proprietary trace manager may be provided.

In other embodiments, a different operating system may be used, such as Windows 7 (trade mark), or Linux (trade mark).

In other embodiments, the self-service terminal may be an information kiosk, a financial services centre, a bill payment kiosk, a lottery kiosk, a postal services machine, a check-in and/or check-out terminal such as those used in the retail, hotel, car rental, gaming, healthcare, and airline industries, or the like.

In other embodiments, the code-tracing may be selectable from more than three different detail levels or fewer than three different detail levels. The different detail levels may be referred to as profiles. Any desired number of profiles may be provided.

In other embodiments, the predefined time period may be longer or shorter than twenty minutes.

In other embodiments, the safety period may be longer or shorter than twelve hours.

In the above embodiment, the software components including instrumented code comprise a control application. In other embodiments, the software components including instrumented code may comprise other applications executing in the environment of an operating system and/or a runtime platform, service providers, drivers, or the like.

The runtime platform may also store a trace log (an XFS trace log) relating to instrumented code in the service providers. The trace manager 50 may access this XFS trace log in addition to the trace log 52 to detect any errors occurring at the service provider level in addition to any errors occurring at the control application level.

In other embodiments, the trace manager 50 may detect patterns of unhandled exceptions, and may create or update a profile to include trace details that are appropriate for those patterns.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

What is claimed is:

1. A method of managing code-tracing data, the method comprising the steps of:
   analyzing a log of code-tracing data to identify a module in which an error occurred based on a category associated with the error, the category identifying data types in the code-tracing data;
   activating code-tracing at a high detail level in that module;
   identifying modules associated with that module;
   activating code-tracing at a high detail level in those identified modules; and
   sending a message to a remote management center when the error occurred within a predefined set period of time since a last error.

2. A method according to claim 1, wherein the module in which an error occurred comprises a service in a control application.

3. A method according to claim 2, wherein the identified modules comprise service providers associated with the service.

4. A method according to claim 3, wherein the service providers comprise CEN XFS modules.

5. A method according to claim 1, wherein the method includes the further steps of:
   creating a code-tracing profile to include high detail level code-tracing for the module in which the error occurred; and
   associating a defect type with this profile.

6. A method according to claim 1, wherein the method comprises the further steps of:
   detecting a pattern of errors over a period of time; and
   applying a code-tracing profile appropriate for the detected pattern.

7. A method according to claim 1, wherein the method comprises the further steps of:
   detecting the absence of an error over a defined time period; and
   reducing the code-tracing detail level.

8. A system for managing code-tracing data, the system comprising:
   a trace manager arranged to
   (i) analyze a log of code-tracing data to identify a module in which an error occurred based on a category associated with the error, the category identifying data types in the code-tracing data;
   (ii) activate code-tracing at a high detail level in that module;
   (iii) identify modules associated with that module;
   (iv) activate code-tracing at a high detail level in those identified modules; and
   (v) send a message to a remote management center when the error occurred within a predefined set period of time since a last error.

9. A system according to claim 8, wherein the trace manager comprises a software component.

10. A system according to claim 9, wherein the trace manager is further arranged to:
    create a code-tracing profile to include high detail level code-tracing for the module in which the error occurred; and
    associate a defect type with this profile.

11. A system according to claim 9, wherein the trace manager is further arranged to:
    detect a pattern of errors over a period of time; and
    apply a code-tracing profile appropriate for the detected pattern.

12. A system according to claim 9, wherein the trace manager is further arranged to:
    detect the absence of an error over a defined time period; and
    reduce the code-tracing detail level.

13. A system according to claim 9, wherein the system includes a self-service terminal.

14. A system according to claim 13, wherein the self-service terminal includes a cash dispenser.

* * * * *